United States Patent
Rhee et al.

(10) Patent No.: US 9,473,883 B2
(45) Date of Patent: Oct. 18, 2016

(54) LOCATION SERVICE AUTHORIZATION AND INDICATION

(71) Applicant: Apple Inc., Cupertino, CA (US)

(72) Inventors: Stephen J. Rhee, San Jose, CA (US); Adam M. Driscoll, Atherton, CA (US); Jeffrey Michael Bartunek, Sunnyvale, CA (US); Ronald K. Huang, San Jose, CA (US); Erik Neuenschwander, San Mateo, CA (US); Patrick Coffman, San Francisco, CA (US); Guy L. Tribble, Hillsborough, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/503,215

(22) Filed: Sep. 30, 2014

(65) Prior Publication Data

US 2015/0350823 A1  Dec. 3, 2015

Related U.S. Application Data (60) Provisional application No. 62/006,089, filed on May 31, 2014.

(51) Int. Cl.
*H04W 4/04* (2009.01)
*H04W 4/02* (2009.01)

(52) U.S. Cl.
CPC ...................................... *H04W 4/02* (2013.01)

(58) Field of Classification Search
CPC ..... H04W 4/025; H04W 4/12; H04W 64/00; H04W 4/02; H04L 29/08657; G01S 5/0252; G01S 5/02
USPC ...... 455/456.5, 456, 566, 457, 550.1, 158.4, 455/158.56, 95, 414.3, 456.1, 456.2
See application file for complete search history.

(56) References Cited

U.S. PATENT DOCUMENTS

| | | | | |
|---|---|---|---|---|
| 8,891,514 B1* | 11/2014 | Chen | ...................... | H04L 12/66 370/353 |
| 2009/0239587 A1* | 9/2009 | Negron | ............... | G06F 3/04883 455/566 |
| 2010/0311399 A1* | 12/2010 | Cusick | ............... | H04N 5/44543 455/414.2 |
| 2013/0036117 A1* | 2/2013 | Fisher | ............... | G06F 17/30041 707/736 |
| 2015/0100887 A1* | 4/2015 | Verkasalo | ............. | G06F 3/0482 715/735 |
| 2015/0121464 A1* | 4/2015 | Hughes, Jr. | ........... | H04L 63/105 726/4 |
| 2015/0201245 A1* | 7/2015 | Lau | ...................... | H04N 21/482 725/50 |
| 2015/0257004 A1* | 9/2015 | Shanmugam | ....... | H04L 63/0853 455/411 |
| 2016/0165405 A1* | 6/2016 | Shinozuka | ............... | H04W 4/04 455/456.1 |
| 2016/0165415 A1* | 6/2016 | Cuomo | ................. | H04W 4/021 455/456.1 |

* cited by examiner

*Primary Examiner* — Cong Tran
(74) *Attorney, Agent, or Firm* — Fish & Richardson P.C.

(57) ABSTRACT

An application can specify a location service authorization type to be enforced by a mobile device. After the user authorizes the location service through an authorization dialog, the application can receive location service according to the authorization type. A first authorization type allows the application to receive continuous location updates and location events from a location service on the mobile device only when the application is in use. A second authorization type allows the application to always receive continuous location updates and location events when the application is running in a foreground or background. The text of the authorization dialog can be customized by the application to provide more detail on how the location data will be used by the application.

24 Claims, 7 Drawing Sheets

LOCATION SERVICE AUTHORIZATION AND INDICATION

CROSS-REFERENCE TO RELATED APPLICATIONS

This application claims priority to U.S. Provisional Application Ser. No. 62/006,089, entitled "Location Service Authorization and Indication," filed on May 31, 2014, the entire contents of which are incorporated herein by reference.

TECHNICAL FIELD

This disclosure relates generally to managing location service authorization for location-based service applications.

BACKGROUND

Modern mobile devices (e.g., smart phones, tablet computers, wearable devices) often include location services. A location service provides location data to applications running on the mobile device. The location data can be provided by satellite-based or network-based positioning systems. For example, a Global Positioning System (GPS) receiver can be embedded or coupled to the mobile device that provides GPS data (e.g., latitude, longitude) to the location service. Additionally, radio frequency (RF) signals from access points, beacons or cell towers can be used to determine the location of the mobile device. The location service aggregates location data from the various positioning systems and provides the location data to applications upon request.

Since the advent of location-aware devices, users have become increasingly concerned about the use of their private location data by third parties. To address this concern, mobile device manufacturers desire to provide mechanisms for allowing users to opt out of sharing their location data with applications running on the mobile device.

SUMMARY

An application can specify a location service authorization type to be enforced by a mobile device. After the user authorizes the location service through an authorization dialog, the application can receive location service according to the authorization type. For example, the application can specify one of several authorization types through an application programming interface (API). A first authorization type allows the application to receive continuous location updates from a location service on the mobile device only when the application is in use. In some implementations, an application is considered to be "in use" based on a variety of factors, including but not limited to when the application is visible on a display of the mobile device or when the application is invoked through a voice command (e.g., invoked using an intelligent personal assistant). A second authorization type allows the application to always receive continuous location updates and location events when the application is running in a foreground or background or caused to be running in the background.

In some implementations, an authorization dialog is presented to the user requesting authorization from the user to allow the application to receive location data. The text of the authorization dialog can be customized by the application to provide more detail on how the location data will be used by the application. In some implementations, the application can be configured to display the authorization dialog only once to the user. In some implementations, the authorization type can be specified by setting one or more keys in a file of the application, which are used in conjunction with an API to specify the authorization type and customized dialog text. In some implementations, a settings pane allows a user to set an authorization type for an application on the mobile device. In some implementations, a status indicator is displayed by the application that changes its visual appearance based on the type of location service being provided to the application. In some implementations, a status indicator provides a quick return to an application that is using the location service while the user is working in another application on the display.

Other implementations are directed to systems, devices and non-transitory, computer-readable storage mediums. Particular implementations disclosed herein provide one or more of the following advantages. Application developers have more control over how location services on a mobile device are authorized for their application. Users benefit by receiving more detail about how the location data will be used by the application so that they can make a more informed decision regarding authorization of location service.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example User Interfaces

Figure 1A:
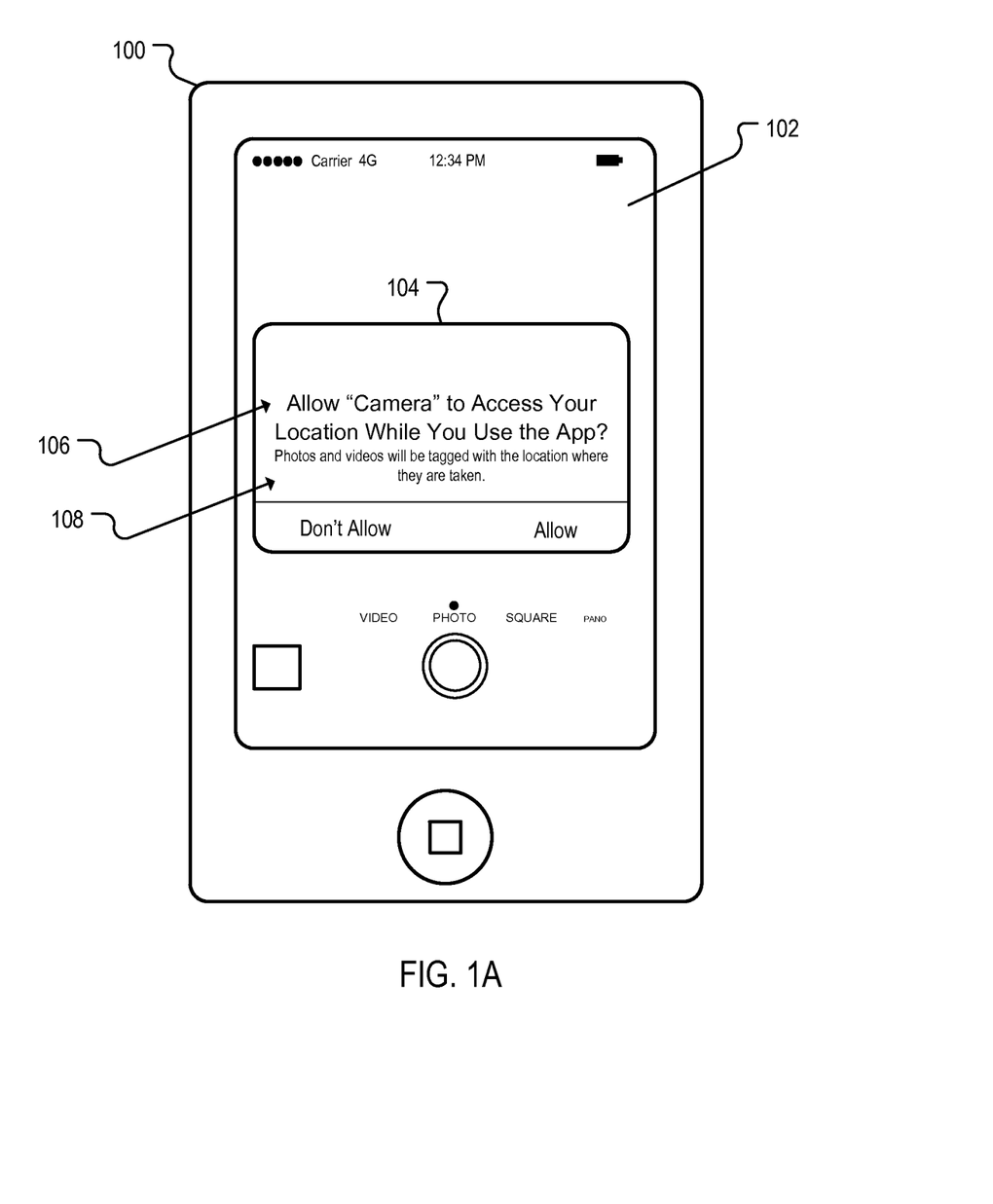
FIG. 1A illustrates an example authorization dialog to allow an application to receive location service when in use.

FIG. 1A illustrates an example authorization dialog 104 to allow a camera application to receive location service when in use. In some implementations, a display of mobile device 100 presents graphical user interface (GUI) 102 of a camera application. In this example, the camera application has specified one of "when in use" or "always" location service authorization types (hereafter also referred to as "WhenInUse" and "Always," respectively). The WhenInUse authorization type (shown in FIG. 1A) allows a location service to provide continuous location updates to the camera application if the camera application (e.g., GUI 102) is "in use." An application is considered to be "in use" based on a variety of factors including but not limited to when the application is visible on a display of the mobile device or when the application is invoked through a voice command (e.g., invoked using an intelligent personal assistant).

The Always authorization type (shown in FIG. 1B) allows the location service to provide continuous location updates and location events (e.g., a geofence crossing, significant location detection) to the application when the application is running in the foreground or background or caused to be running in the background on mobile device 100. When the application is launched, authorization dialog 104 can be presented in GUI 102. Authorization dialog 104 includes generic text 106 provided by an operating system of mobile device 100 and custom text 108 provided by the application.

In FIG. 1A, the operating system provided the generic text "Allow 'Camera' to Access Your Location While You Use the App?" and the camera application provided the custom text "Photos and videos will be tagged with the location where they are taken." Custom text 108 provided by the camera application addresses the user's privacy concerns about their location data being shared with third parties. The user is provided with user interface elements (e.g., "Don't Allow" and "Allow" buttons) to allow or not allow the camera application to use the location data. In some implementations, authorization dialog 104 is displayed only once after the camera application is launched for the first time after installation or reinstallation of the camera application.

Figure 1B:
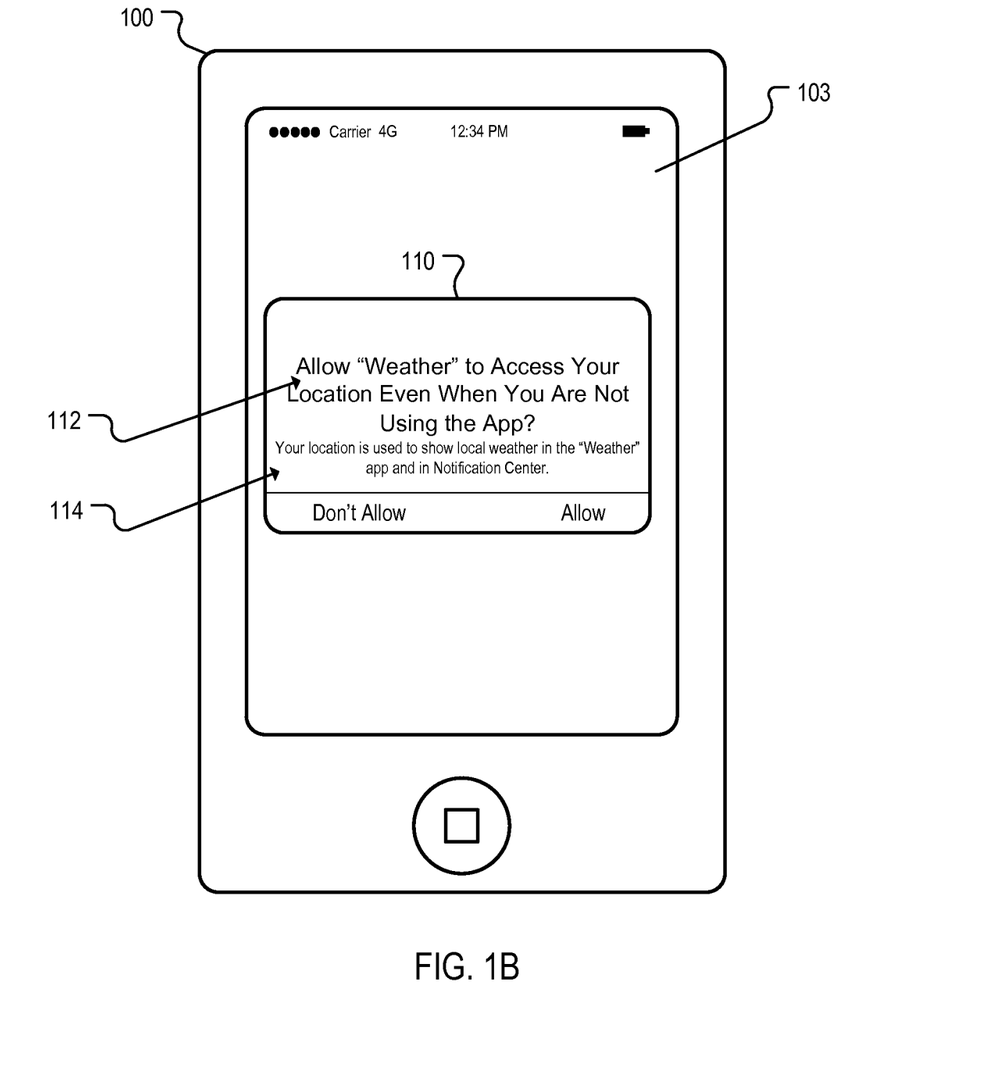
FIG. 1B illustrates an example authorization dialog to allow an application to always receive location service.

FIG. 1B illustrates an example authorization dialog to always allow a weather application to receive location service. The operating system provided generic text 112 in GUI 103: "Allow 'Weather' to Access Your Location While You Use the App?" The weather application provided customer text 114: "Your location is used to show local weather in the 'Weather' app and in Notification Center." Custom text 114 provided by the weather application addresses the user's privacy concerns about their location data being shared with third parties. The user is provided with user interface elements (e.g., "Don't Allow" and "Allow" buttons) to allow or not allow the weather application to use the location data. In some implementations, authorization dialog 110 is displayed only once after the weather application is launched for the first time after installation or reinstallation of the weather application.

Figure 1C:
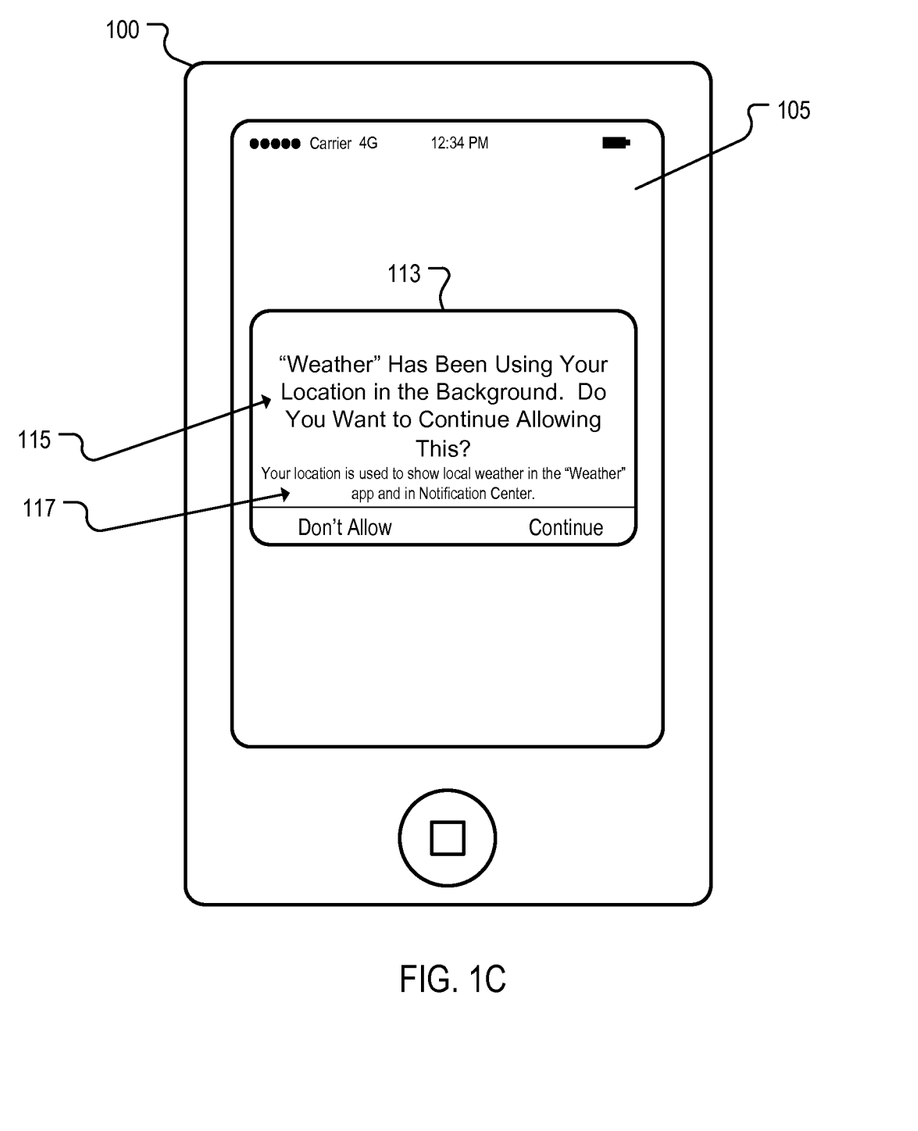
FIG. 1C illustrates an example reminder authorization dialog to allow an application to always receive location service.

FIG. 1C illustrates an example reminder authorization dialog 113 to allow a weather application to continue to always receive location service. Reminder authorization dialog 113 is a delayed (e.g., several days later) reminder to the user that is presented in GUI 105 of mobile device 100, only if the application specifies the Always authorization type and the user had previously authorized the location service. In some implementations, a display of mobile device 100 presents GUI 105 of a weather application. The operating system may present the authorization dialog 113 in GUI 105 at an appropriate time. Authorization dialog 113 includes generic text 115 provided by the operating system of mobile device 100 and custom text 117 provided by the weather application.

In the example shown, the operating system provided the generic text "'Weather' Has Been Using Your Location in the Background. Do you want to Continue Allowing this?" and the weather application provided the custom text "Your current location is used to show local weather in the 'Weather' app and in Notification Center." The user is provided with user interface elements (e.g., "Don't Allow" and "Continue" buttons) to allow or not allow the weather application to use the location data.

Figure 1D:
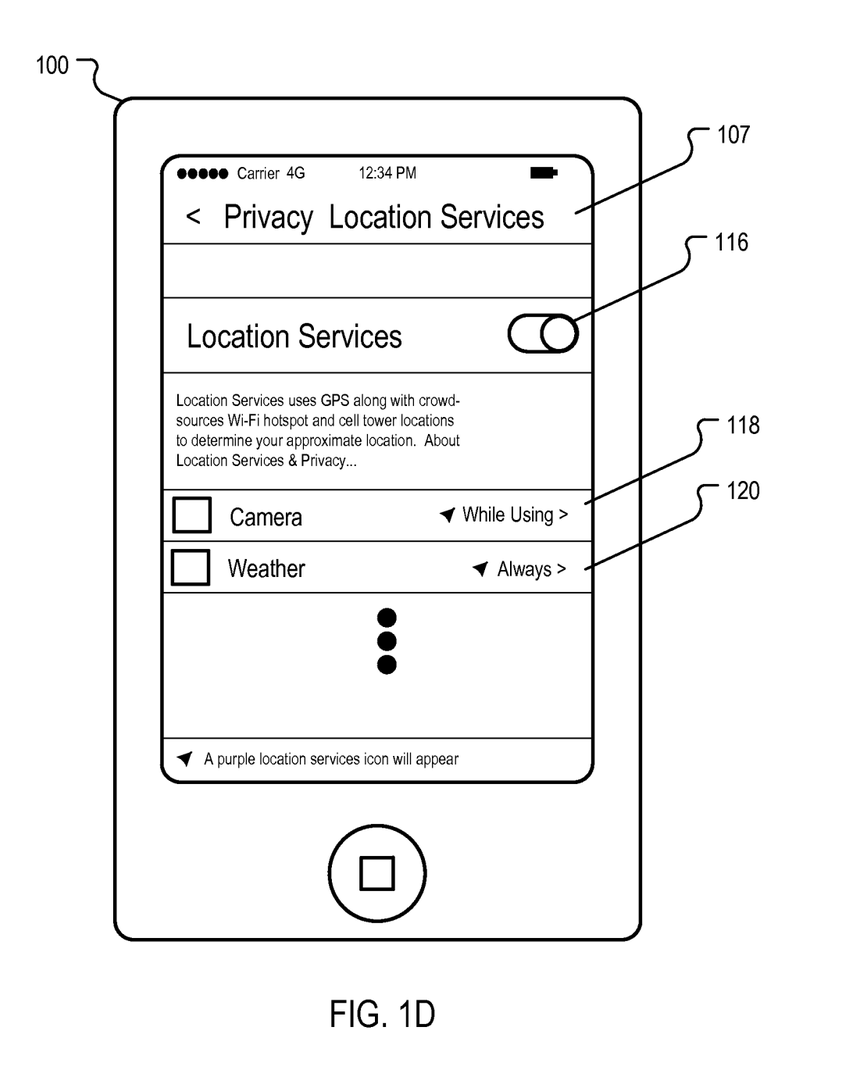
FIG. 1D illustrates an example settings pane that allows a user to specify a location service authorization type for an application.

FIG. 1D illustrates an example settings pane that allows a user to specify a location service authorization type for an application. In some implementations, a user can specify a location service authorization type using GUI 107. GUI 107 can provide a user interface element 116 for allowing the user to turn off location service for all applications. GUI 107 can also include user interface elements 118, 120 corresponding to the camera and weather applications, respectively, which allow the user to specify one of the WhenInUse and Always location service authorization types for the corresponding application. Accordingly, the user may use elements 118, 120 to override the location service authorization type granted by the user.

Example System

Figure 2:
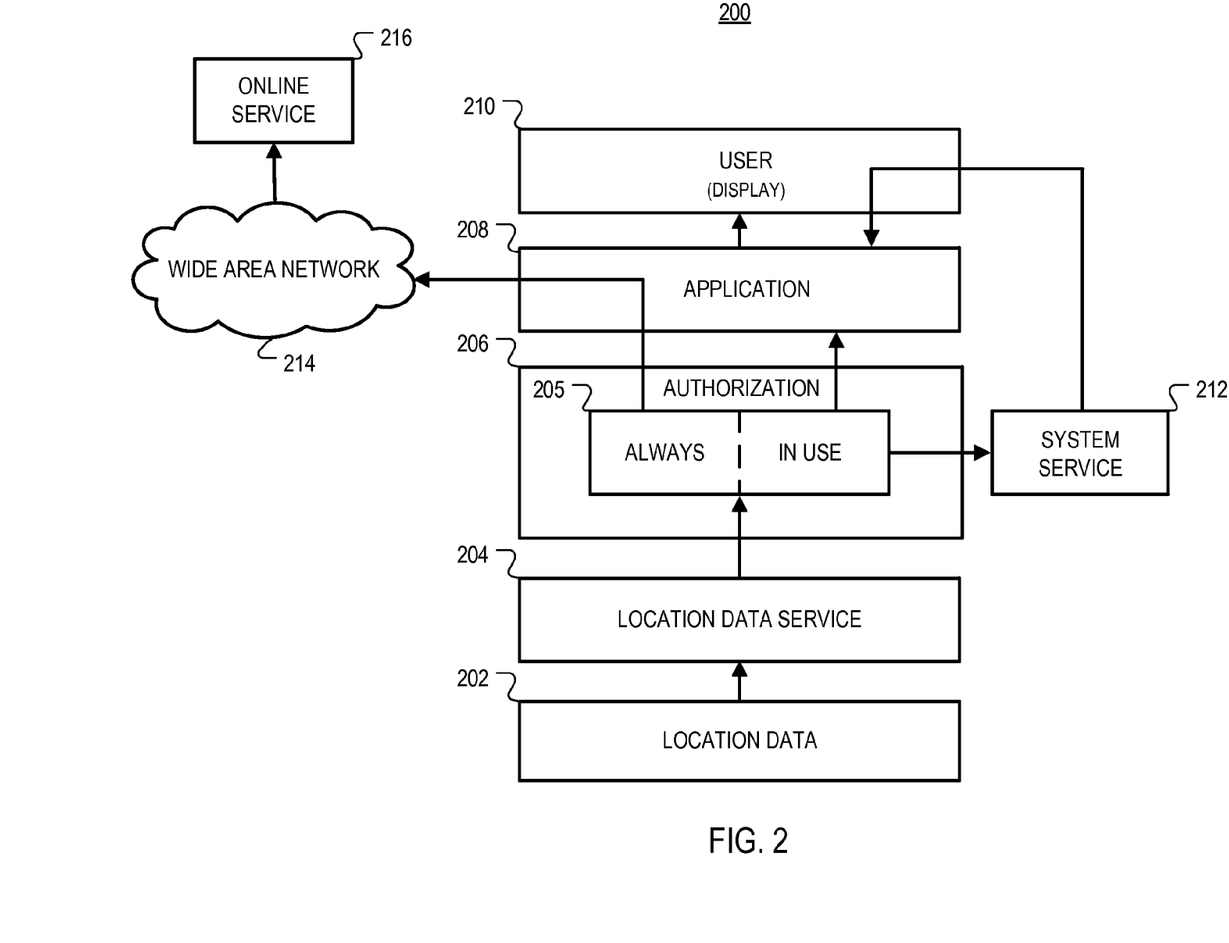
FIG. 2 is a conceptual diagram illustrating a system for location service authorization and indication.

FIG. 2 is a conceptual diagram illustrating system 200 for location service authorization and indication. In some implementations, system 200 is implemented by a software stack installed on mobile device 100. Location data 202 is collected by location service 204, which provides the location data 202 to application 208 based on the location service authorization type that is currently enforced by authorization module 205, which can be included in location service module 206. Location data 202 can be provided by one or more position systems of mobile device 100 including satellite-based positioning systems (e.g., GPS) and network-based positioning systems (e.g., WiFi, cellular).

If an Always authorization type is enforced by authorization module 205, location data 202 is provided by location service 204 to application 208 when application 208 is running in the foreground or background on mobile device 100. Application 208 may send location data 202 to online service 216 (e.g., Facebook®) through network 214 (e.g., the Internet).

If a WhenInUse authorization type is enforced by authorization module 205, when application 208 is in use (e.g., its GUI is displayed), then location service 204 can send location data 202 directly to application 208, where it can be displayed to user 210. If application 208 is not in use, system service 212 can involve the user so that the user can bring application 208 into use and provide location data 202 to application 208. For example, a notification can be displayed that can be selected by the user to bring application 208 back into use. In this case, application 208 can choose to send location data 202 to online service 216 because the user knows application 208 is in use, as opposed to the case when Always authorization is enforced and the user may not be aware that application 208 is running and has received location data 202.

Example Process

Figure 3:
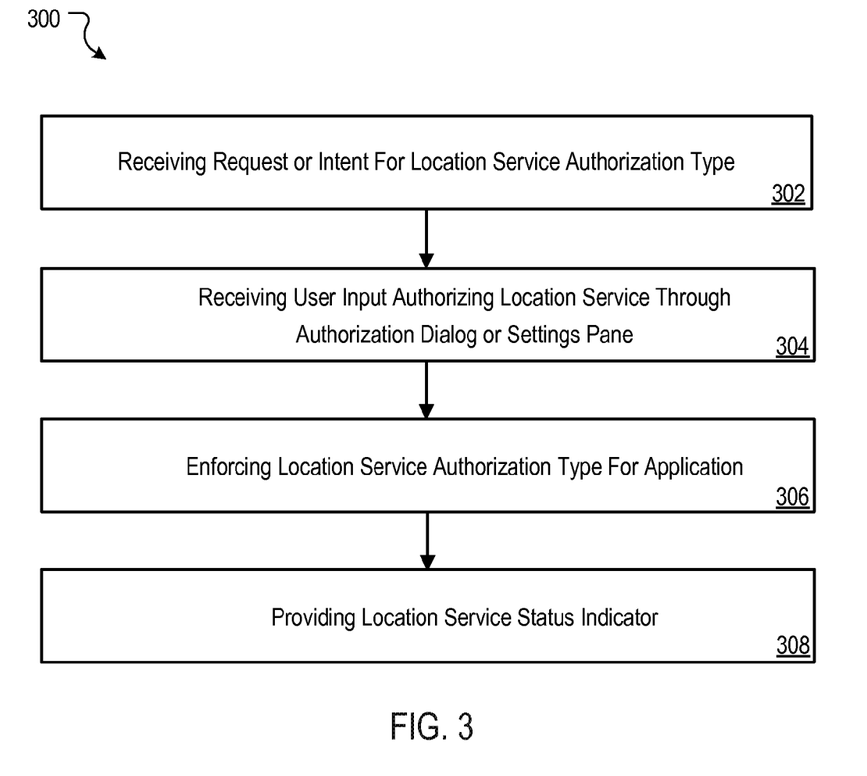
FIG. 3 is a flow diagram of example process for location service authorization and indication.

FIG. 3 is a flow diagram of example process 300 for location service authorization and indication. Process 300 can be implemented using the architecture described in reference to FIG. 4.

In some implementations, process 300 can begin by receiving a request or intent for a location service authorization type (302). The location service authorization type can be specified by an application through an API. In some implementations, the location service authorization type can be determined statically using metadata of the application. For example, the location service authorization type can be specified by one or more keys in a file of the application. For example, for mobile devices running iOS operating system developed by Apple Inc. (Cupertino, Calif.), an info.plist of an application installed on the mobile device can set one of the keys NSLocationWhenInUseUsageDescription or NSLocationAlwaysUsageDescription. The keys indicate what the application may do in the future, which causes, for example, the settings pane shown in FIG. 1D to include a user interface element for the application.

In addition to the keys in the info.plist, an authorization request API is called with one of the API parameters requestWhenInUseAuthorization or requestAlwaysAuthorization set. The API parameters inform the system what the application wants to request from the user. Other location service authorization types are also possible. In some implementations, a default location service authorization type can be enforced if not specified by an application or the user.

Process 300 can continue by receiving user input authorizing the location service through an authorization dialog or settings pane (FIG. 1D) according to the location service authorization type (304). The authorization dialog can include generic or default text provided by an operating system of the mobile device and custom text provided by the application. Generic text can be specific to the location authorization type to be enforced for the application. Custom text can describe how the location data will be used by the application. The authorization dialog can include one or more user interface elements that can be selected by the user to allow or not allow the application to receive location data.

Process 300 can continue by enforcing the location service authorization type for the application (306). For example, an authorization module can determine when an application is requesting location data and based on the location service authorization type enforced for the application, determine whether to provide the location data to the application ("Always"). If the application does not meet the WhenInUse constraints, an operating system service can still provide the location service to the user without providing the location service to the application so that the user need not trust the application to be the direct recipient of the location service.

Process 300 can continue while the application is running and receiving location data by displaying a status indicator (308) on the display of the mobile device. The status indicator (e.g., an icon) can have a first visual appearance (e.g., a solid icon) based on a first location service type (e.g., foreground or background location data use, ranging, significant location changes) and a second visual appearance (e.g., a hollow icon) based on a second location service type (e.g., region/geofence monitoring).

In some implementations, if a WhenInUse application which is actively tracking the user's location ceases to be visible to the user (e.g., the user is using a different application in the foreground) a status indicator (e.g., a banner display) can be presented in the GUI that when selected by the user (e.g., touched by the user), provides a quick return back to the WhenInUse application if the application is still using the location service. The status indicator allows the user to return to the application more quickly and also prevents applications from doing this surreptitiously. For example, certain applications (e.g., an exercise tracker application) is considered "in use" even when not running in the foreground.

Example Client Architecture

Figure 4:
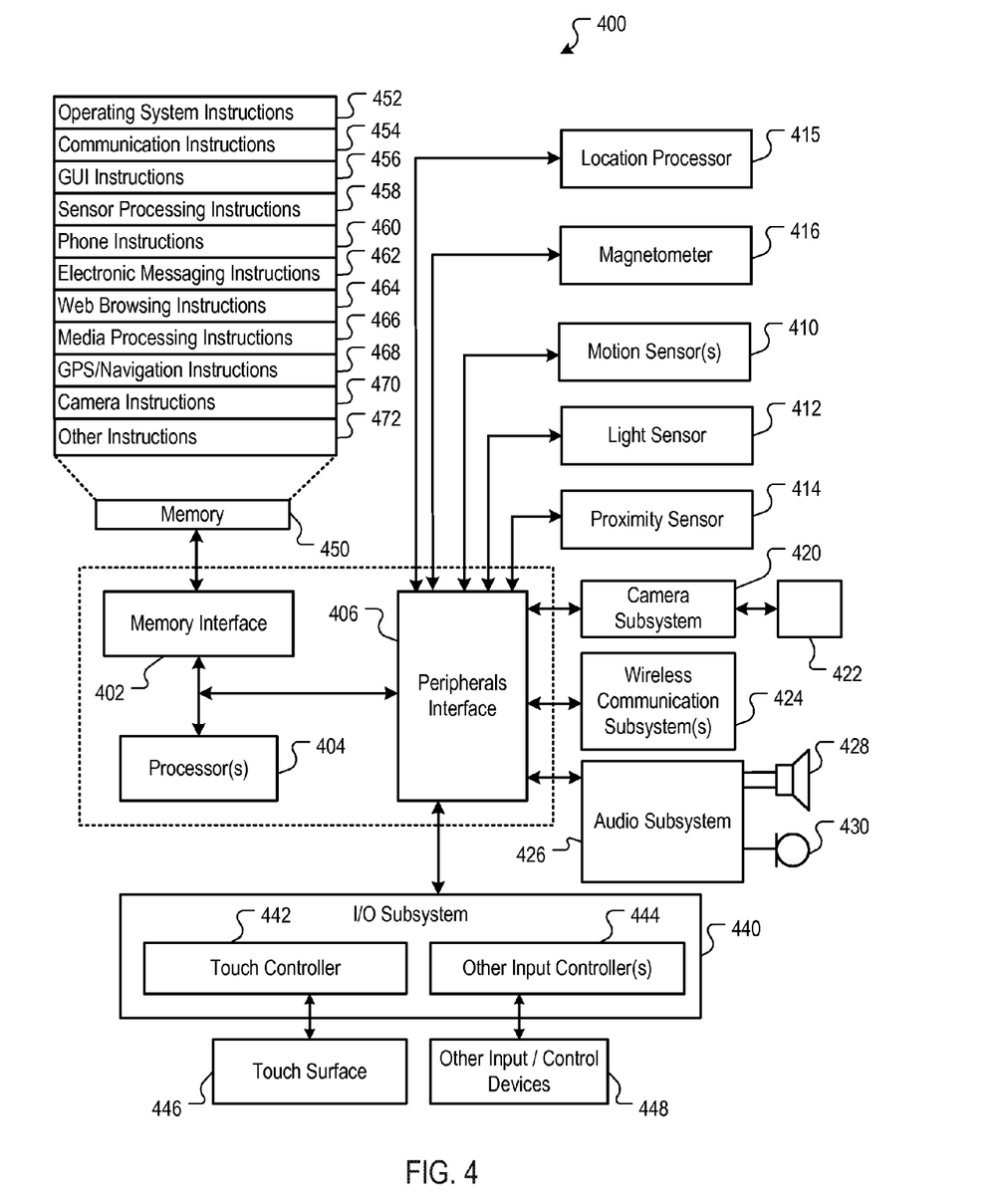
FIG. 4 is a block diagram of example client device architecture for implementing the features and processes described in reference to FIGS. 1-3.

FIG. 4 is a block diagram of example architecture for a mobile device, as described in reference to FIGS. 1-3. Architecture 400 may be implemented in any mobile device for generating the features described in reference to FIGS. 1-3, including but not limited to portable computers, smart phones and tablet computers, game consoles, wearable computers and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver chip) may be connected to peripherals interface 406 to provide georeferencing. Electronic magnetometer 416 (e.g., an integrated circuit chip) may also be connected to peripherals interface 406 to provide data that may be used to determine the direction of magnetic North. Thus, electronic magnetometer 416 may be used with an electronic compass application.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications, as described in reference to FIGS. 1-6. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and other instructions 472 for performing some or all of the processes, as described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a processor of a mobile device, a request or intent, from an application running on the mobile device, for one of a plurality of location service authorization types for the application, wherein in a first location service authorization type allows location data to be sent by a location service to the application when the application is not in use and a second location service authorization type allows location data to be sent by the service to the application only when the application is displayed on a display screen of the mobile device;
   presenting, by the processor, an authorization dialog on the display screen of the mobile device;
   receiving user input, through the authorization dialog, authorizing location service for the application; and
   enforcing, by the processor, the location service authorization type for the application, the enforcing including determining whether to provide the location data to the application based on the location service authorization type for the application.

2. The method of claim 1, wherein the authorization dialog includes text provided by the application.

3. The method of claim 1, wherein enforcing the location service authorization type includes:
   determining that the authorization type specifies that the application will receive location updates only when the application is determined to be in use;
   determining that the application is not in use; and responsive to determining that the application is not in use, presenting a notification on the display that can be selected by the user to bring the application into use.

4. The method of claim 3, further comprising:
determining that the application is in use by confirming that the application is in use.

5. The method of claim 1, wherein enforcing the location service authorization type includes determining that the authorization type specifies that the application will always receive location updates and location events when the application is running in foreground or background or caused to be running in the background.

6. The method of claim 1, wherein the authorization dialog is configured to be displayed only once on the display screen.

7. The method of claim 1, wherein the application type is determined statically using metadata of the application.

8. The method of claim 1, further comprising:
displaying a first status indicator having a first visual appearance to indicate a first location service type.

9. The method of claim 8, further comprising:
displaying a second status indicator having a second visual appearance different than the first visual appearance to indicate a second location service type.

10. The method of claim 1, further comprising:
displaying a settings pane on the display screen including a user interface element for specifying the authorization type for the application;
receiving input through the user interface element, the input specifying a new authorization type for the application; and
replacing the authorization type with the new authorization type.

11. The method of claim 1, wherein the location authorization service type specifies one of providing location updates to the application only when the application is in use and always providing location updates to the application regardless of whether the application is in use.

12. The method of claim 1, wherein the second location service authorization type allows location data to be sent by the service to the application when the application is invoked through a voice command.

13. A system comprising:
a display screen;
one or more processors;
memory coupled to the one or more processors and configured to store instructions, which, when executed by the one or more processors, causes the one or more processors to perform operations comprising:
receiving a request or intent, from an application for one of a plurality of location service authorization types for the application, wherein in a first location service authorization type allows location data to be sent by a location service to the application when the application is not in use and a second location service authorization type allows location data to be sent by the service to the application only when the application is displayed on the display screen of the mobile device;
presenting an authorization dialog on the display screen of the system;
receiving user input, through the authorization dialog, authorizing location service for the application; and
enforcing the location service authorization type for the application, the enforcing including determining whether to provide the location data to the application based on the location service authorization type for the application.

14. The system of claim 13, wherein the authorization dialog includes text provided by the application.

15. The system of claim 13, wherein enforcing the location service authorization type includes:
determining that the authorization type specifies that the application will receive location updates only when the application is determined to be in use;
determining that the application is not in use; and
responsive to determining that the application is not in use, presenting a notification on the display that can be selected by the user to bring the application into use.

16. The system of claim 15, further comprising:
determining that the application is in use by confirming that the application is in use.

17. The system of claim 13, wherein enforcing the location service authorization type includes determining that the authorization type specifies that the application will always receive location updates and location events when the application is running in foreground or background or caused to be running in the background.

18. The system of claim 13, wherein the dialog is configured to be displayed only once on the display screen.

19. The system of claim 13, wherein the application type is determined statically using metadata of the application.

20. The system of claim 13, further comprising:
displaying a first status indicator having a first visual appearance to indicate a first location service type.

21. The system of claim 20, further comprising:
displaying a second status indicator having a second visual appearance different than the first visual appearance to indicate a second location service type.

22. The system of claim 13, further comprising:
displaying a settings pane on the display screen including a user interface element for specifying the authorization type for the application;
receiving input through the user interface element, the input specifying a new authorization type for the application; and
replacing the authorization type with the new authorization type.

23. The system of claim 13, wherein the location authorization service type specifies one of providing location updates to the application only when the application is in use and always providing location updates to the application regardless of whether the application is or is not in use.

24. The system of claim 13, wherein the second location service authorization type allows location data to be sent by the service to the application when the application is invoked through a voice command.

* * * * *